(12) United States Patent
Calvel et al.

(10) Patent No.: US 10,427,371 B2
(45) Date of Patent: **\*Oct. 1, 2019**

(54) MOLDING ELEMENT FOR MANUFACTURING A NOISE REDUCING TREAD

(71) Applicant: COMPAGNIE GENERALE DES ETABLISSEMENTS MICHELIN, Clermont-Ferrand (FR)

(72) Inventors: Romain Calvel, Clermont-Ferrand (FR); Khotchakorn Pengsaloong, Tokyo (JP); Supradit Khaoyabut, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,650

(22) PCT Filed: Sep. 20, 2016

(86) PCT No.: PCT/JP2016/004286
§ 371 (c)(1),
(2) Date: Mar. 27, 2018

(87) PCT Pub. No.: WO2017/056457
PCT Pub. Date: Apr. 6, 2017

(65) Prior Publication Data
US 2018/0281326 A1 Oct. 4, 2018

(30) Foreign Application Priority Data
Sep. 30, 2015 (WO) .................. PCT/JP2015/078427

(51) Int. Cl.
*B29D 30/06* (2006.01)
*B60C 11/03* (2006.01)
*B29C 33/12* (2006.01)

(52) U.S. Cl.
CPC ...... *B29D 30/0606* (2013.01); *B60C 11/0327* (2013.01); *B29C 33/123* (2013.01); *B29D 2030/061* (2013.01); *B29D 2030/0612* (2013.01)

(58) Field of Classification Search
CPC ........ B29D 30/0606; B29D 2030/0612; B29C 33/123; B60C 11/1369
See application file for complete search history.

(56) References Cited

U.S. PATENT DOCUMENTS 6,143,223 A    11/2000   Merino Lopez
6,484,772 B1 * 11/2002   De Labareyre ........ B29D 30/52
                                                 152/209.17

(Continued)

FOREIGN PATENT DOCUMENTS

EP     0858875 A1    8/1998
JP     55-113606 U   8/1980

(Continued)

OTHER PUBLICATIONS

International Search Report issued in PCT/JP2016/004286 dated Nov. 22, 2016.

*Primary Examiner* — James P Mackey
(74) *Attorney, Agent, or Firm* — Dickinson Wright PLLC (57) ABSTRACT

The present disclosure provides a molding element for a mold used for manufacturing a tread of a tire having a plurality of contacting element, a plurality of grooves and a connecting member connecting two side faces of adjacent contacting elements, the molding element having a molding surface and a rib for forming the groove between adjacent contacting elements, at least two rib side faces, the rib (Continued)

having a notching portion, the guiding member having a guiding slit extending from one of the two opposite side faces to the other of the two opposite side faces through the guiding member and radially from the top face, at least one of faces of the notching portion is provided with a means for keeping the guiding member in place in the notching portion.

11 Claims, 9 Drawing Sheets

(56) References Cited

U.S. PATENT DOCUMENTS

| | | |
|---|---|---|
| 2005/0238744 A1 | 10/2005 | Nakai |
| 2008/0152744 A1 | 6/2008 | Nguyen et al. |
| 2010/0186861 A1* | 7/2010 | Ishiguro ............ B60C 11/0306 152/209.25 |
| 2018/0001715 A1 | 1/2018 | Tezuka |

FOREIGN PATENT DOCUMENTS

| | | |
|---|---|---|
| JP | 2002-331525 A | 11/2002 |
| KR | 10-2013-0078562 A | 7/2013 |
| WO | 2016/104662 A1 | 6/2016 |

* cited by examiner

MOLDING ELEMENT FOR MANUFACTURING A NOISE REDUCING TREAD

CROSS-REFERENCE TO RELATED APPLICATIONS

This application is a 371 national phase entry of PCT/JP2016/004286, filed 20 Sep. 2016, which claims the benefit of International Patent Application No. PCT/JP2015/078427, filed 30 Sep. 2015.

BACKGROUND

In recent years, premiumisation and quality improvement of vehicles leads, from the view point of occupant's comfort and environmental considerations, desire to various noise reductions, in particular pass-by noise.

When a contacting element on a tread of a tire enters to or exits from a contact patch during rolling, the tread is forced to be bent due to flattening. At this stage, geometrical discontinuity caused by periodical contact of relatively axial grooves to the contact patch leads inhomogeneity of a bending stiffness of the tread in a circumferential direction and excites internal construction of the tire to generate noise.

In order to reduce such inhomogeneity of the bending stiffness of the tread in a circumferential direction, it is known that reduction of a volume of the axial groove is effective. However, it is also known that reduction of the volume of the axial groove penalizes hydroplaning performance of the tread. Thus, it is desired to improve noise performance while maintaining hydroplaning performance.

The applicants have proposed in FIG. 1 of an international patent application PCT/JP2015/086150, a pneumatic tire tread having a connecting member connecting a transverse face of a contacting element to a transverse face of a circumferentially adjacent contacting element and being made of a material having a higher Young modulus than a Young modulus of a contacting element to obtain satisfactory hydroplaning performance and satisfactory noise performance at the same time. In FIG. 6, is disclosed a pneumatic tire tread having a connecting member connecting a transverse face of a contacting element to a transverse face of circumferentially adjacent contacting element and extending continuously through two transverse faces of the same contacting element for improving productivity of such tread.

However, embedding such connecting member in the contacting element so as to connect two side faces of adjacent contacting elements across the groove requires complicated manufacturing process, thus improvement of productivity of such tread is still insufficient.

EP0858875A1 discloses, in FIG. 1, a mold having a first die and a second die functionally adapted to form at least one orifice allowing a rubber passing through the orifice during molding. However with such configuration, it is difficult to remove the first die or the second die which forms a bottom of a groove or an incision in particular in a form of a tire, thus a complicated process for removing such die is still required.

KR20130078562A discloses, in FIGS. 3 to 5, a method and a mold for manufacturing a pneumatic tire having a reinforced cord crossing a groove using a reinforced cord insertion block installed in a mold. However with such configuration, it is difficult to give a movement to the reinforced cord insertion block, necessary to place the reinforced cord into the reinforced cord insertion block thus a complicated process is still required, and moreover difficult to prevent rubber from flashing into the groove.

US20080152744A1 discloses, in FIG. 1, a molding element suitable for molding sunken grooves or sipes in a tread, and such device may be comprised of a thin flexible wire. However, with such molding element it is difficult to place a connecting member as to connect side faces of different contacting elements as the thin flexible wire is pulled out from the tread.

A "tire" means all types of elastic tire whether or not subjected to an internal pressure.

A "green tire" means a superposition of a plurality of semi-finished rubber products present in the form of strips or sheets, with or without reinforcement. The green tire is intended to be vulcanized in a mold in order to obtain the tire.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "modulus at 10% elongation" is a tensile stress (in MPa) at ten percent (10%) elongation measured according to ASTM standard D412.

A "groove" is a space between two rubber faces/sidewalls which do not contact between themselves under usual rolling condition connected by another rubber face/bottom. A groove has a width and a depth.

It is thus an object of the disclosure to provide a molding element for a mold used for manufacturing a tread of a tire, such molding element can improve productivity for manufacturing a tread provided with a connecting member connecting two side faces of adjacent contacting elements.

SUMMARY

The present disclosure provide a molding element for a mold used for manufacturing a tread of a tire having a plurality of contacting element delimited by a plurality of grooves and a connecting member connecting two side faces of adjacent contacting elements, the molding element having a molding surface for forming a contact face of the contacting elements intended to come into contact with ground during rolling and a rib for forming the groove between adjacent contacting elements, at least two rib side faces forming the side faces of the contacting element, the rib having a notching portion, a guiding member made of a material different from a material of the molding element being received in the notching portion and having two opposite side faces configured to form a part of the side faces of the contacting element and a top face configured to form a part of a bottom of the groove, said material of the guiding member having a modulus at 10% elongation lower than that of the molding element, the guiding member having a guiding slit extending from one of the two opposite side faces to the other of the two opposite side faces through the guiding member and radially from the top face, at least one of faces of the notching portion is provided with a means for keeping the guiding member in place in the notching portion.

This arrangement improves productivity for manufacturing a tread provided with a connecting member connecting two side faces of adjacent contacting elements.

Since the guiding slit extends from one of the opposite two side faces to the other of the opposite two side faces through the guiding member, the guiding slit can receive the connecting member to be positioned at a predetermined position during molding, and release the connecting member from the mold during demolding without any complicated process. As a result, productivity for manufacturing the tread provided with the connecting member can be improved.

Since the material constituting the guiding member has lower modulus at 10% elongation. than that of the molding element, it is possible to let the connecting member enter to/exit from the guiding slit. Once the connecting member has passed, the guiding slit is substantially closed for preventing rubber from flashing into the guiding slit during molding which would prevent rubber from flashing in the groove after demolding.

Since the guiding member made of the material different from the material constituting the molding element is received in the notching portion, it is possible to maintain a form of the side faces of the contacting element. As a result hydroplaning performance can be maintained. At the same time, since the guiding member which exposed to stresses from the connecting member is constructed as a separate and replaceable member in the molding element, maintenance of the molding element can be easier.

Since at least one of a faces of the notching portion is provided with a means for keeping the guiding member in place in the notching portion, it is possible to keep or maintain the guiding member in place in the notching portion during molding and demolding sustaining a force applied from the connecting member not only in radial orientation but also in a direction along which the connecting member is extending. As a result, productivity for manufacturing the tread provided with the connecting member can be improved.

In another preferred embodiment, the means for keeping the guiding member in place in the notching portion is a convex portion.

According to this arrangement, it is possible to keep or maintain the guiding member in place in the notching portion during molding and demolding sustaining the force applied from the connecting member in particular in the direction along which the connecting member is extending by minimum modification of the faces of the notching portion by increasing contact surface area between the guiding member and the notching portion. As a result, productivity for manufacturing the tread provided with the connecting member can be improved.

In another preferred embodiment, the means for keeping the guiding member in place in the notching portion is a concave portion.

According to this arrangement, it is possible to keep or maintain the guiding member in place in the notching portion during molding and demolding sustaining the force applied from the connecting member in particular in the direction along which the connecting member is extending by minimum modification of the faces of the notching portion by increasing contact surface area between the guiding member and the notching portion. As a result, productivity for manufacturing the tread provided with the connecting member can be improved.

In another preferred embodiment, a bottom face of the notching portion is provided with the means for keeping the guiding member in place in the notching portion.

According to this arrangement, it is possible to keep the guiding member in place in the notching portion during molding and demolding sustaining the force applied from the connecting member in particular in the direction along which the connecting member is extending by minimum modification of the bottom face of the notching portion. As a result, productivity for manufacturing the tread provided with the connecting member can be improved.

In another preferred embodiment, the side face of the notching portion is provided with the means for keeping the guiding member in place in the notching portion.

According to this arrangement, it is possible to keep or maintain more reliably the guiding member in place in the notching portion during molding and demolding sustaining the force applied from the connecting member in particular in the direction along which the connecting member is extending by supporting the guiding member from two directions.

In another preferred embodiment, all the faces of the notching portion are provided with the means for keeping the guiding member in place in the notching portion.

In another preferred embodiment, at least one of the faces of the notching portion is provided with plurality of the convex portions or the concave portions.

According to this arrangement, it is possible to keep or maintain more reliably the guiding member in place in the notching portion during molding and demolding sustaining the force applied from the connecting member thanks to a level difference made via the plurality of the convex portions or the concave portions relative to the face of the notching portion provided with such portions, thus productivity of the tread would further be improved.

In another preferred embodiment, at least one of the faces of the notching portion is provided with both the convex portion and the concave portion.

According to this arrangement, it is possible to keep or maintain still more reliably the guiding member in place in the notching portion during molding and demolding sustaining from the force applied from the connecting member thanks to an emphasized level difference made via both the convex portion and the concave portion relative to the face of the notching portion provided with such portions, thus productivity of the tread would further be improved.

In another preferred embodiment, at least one of the faces of the notching portion is provided with plurality of both the convex portions and/or the concave portions.

According to this arrangement, it is possible to keep or maintain still more reliably the guiding member inside the notching portion during molding and demolding sustaining from the force applied from the connecting member thanks to a level difference made via plurality of both the convex portions and/or the concave relative to the face of the notching portion provided with such portions, thus productivity of the tread would further be improved.

In another preferred embodiment, a convex distance L of the convex portion and/or a concave distance D of the concave portion is at least equal to 0.05 mm.

If this distance L and/or D is less than 0.05 mm, there is a risk that the guiding member is not able to be kept or maintained in place in the notching portion due to insufficient volume of the convex portion and/or the concave portion for sustaining from the force applied from the connecting member during molding and demolding. By setting this distance L and/or D at least equal to 0.05 mm, volume of the convex portion and/or the concave portion is sufficient for sustaining the force applied from the connecting member during molding and demolding and therefore, productivity for manufacturing the tread provided with the connecting member can effectively be improved.

This distance L and/or D is preferably at least equal to 0.1 mm, more preferably at least equal to 0.3 mm and still more preferably at least equal to 0.5 mm and at most equal to 50% height of the rib and particularly at least equal to 0.5 mm and at most equal to 30% height of the rib.

In another preferred embodiment, the top face of the guiding member is partly covered by a pair of rib projecting members projecting inwardly from opposed side faces of the notching portion and the guiding slit is exposed through a rib projection opening portion formed between the pair of rib projecting members.

According to this arrangement, the pair of rib projecting member is able to reliably prevent the guiding member from slipping out from the rib during demolding while securing the connecting member entering to/exiting from the guiding slit. As a result, productivity for manufacturing the tread provided with the connecting member can effectively be improved.

In another preferred embodiment, the rib projection opening portion is devoid of the guiding member.

According to this arrangement, since the shape of the guiding member can be maintained as rather simple shape, better productivity and maintenance of the guiding member can be achieved.

BRIEF DESCRIPTION OF THE DRAWINGS

Other characteristics and advantages of the disclosure arise from the description made hereafter in reference to the annexed drawings which show, as nonrestrictive examples, the embodiments of the disclosure.

DETAILED DESCRIPTION

Preferred embodiments of the present disclosure will be described below referring to the drawings.

A molding element 1 for a mold used for manufacturing a tread 101 of a tire, a mold comprising the molding element 1, and a tread 101 molded and vulcanized using the mold according to an embodiment of the present disclosure will be described referring to FIGS. 1 to 5.

Figure 1:
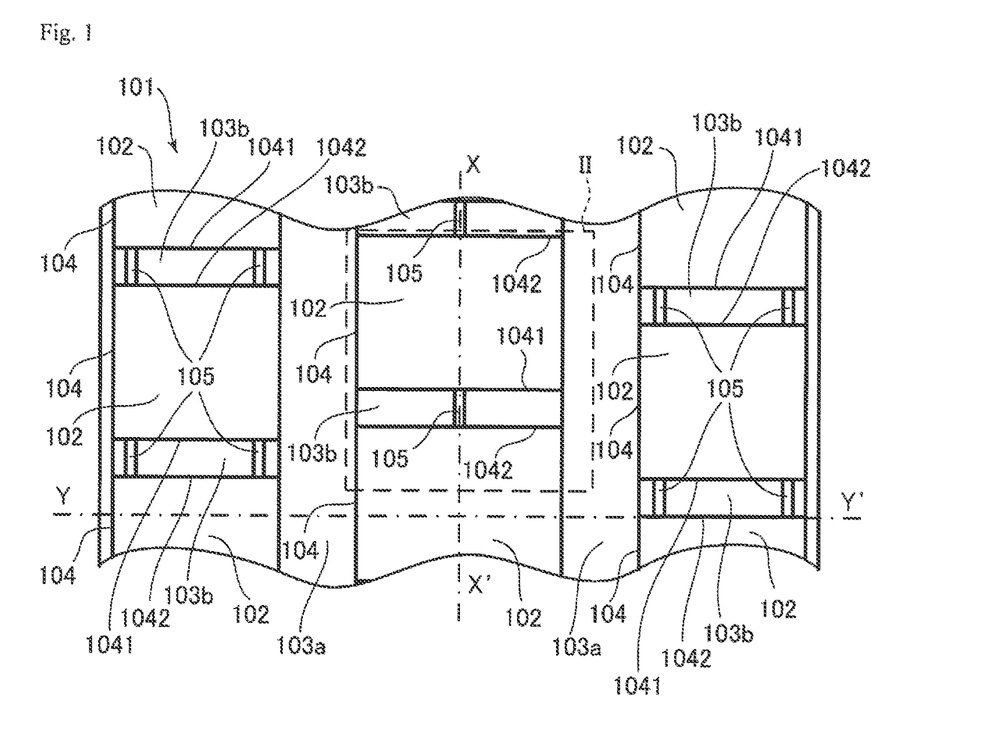
FIG. 1 is a schematic plan view of a tread for a tire molded with a mold comprising a molding element according to first embodiment of the present disclosure.
Figure 2:
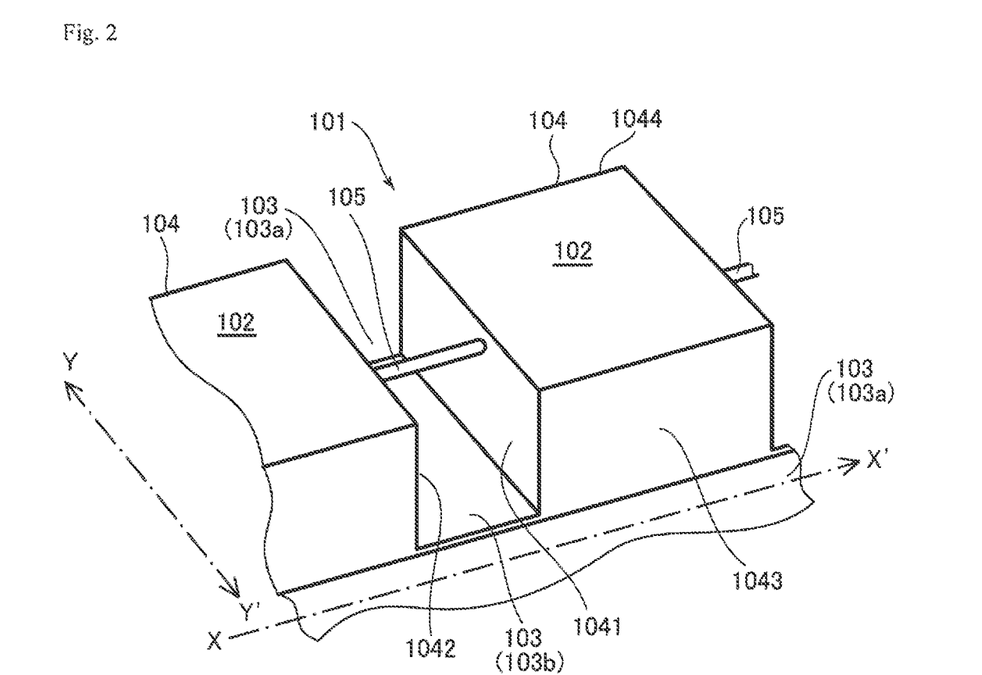
FIG. 2 is an enlarged schematic perspective view showing a portion indicated as II in FIG. 1.
Figure 3:
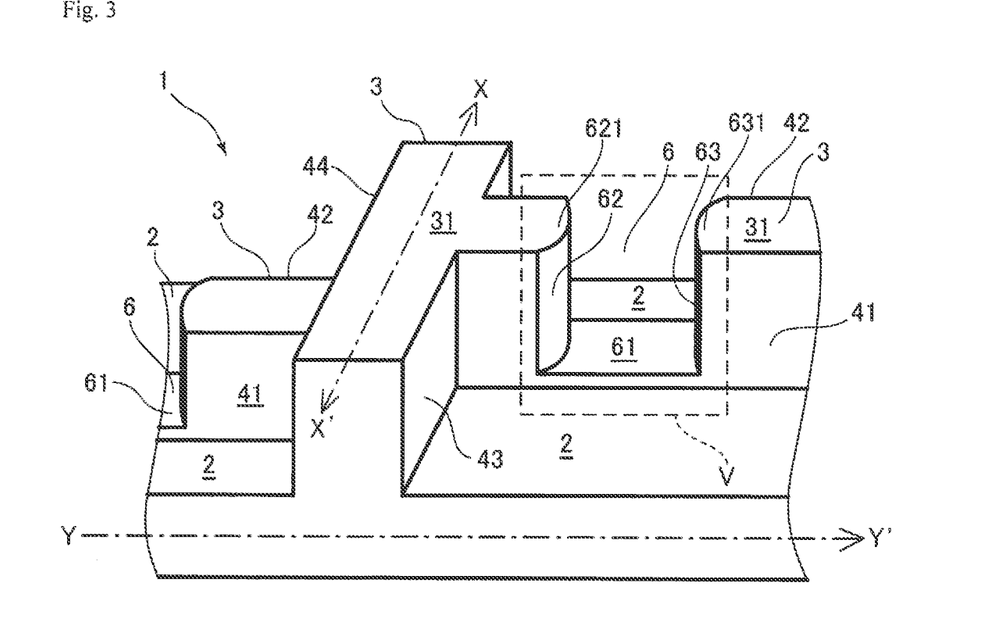
FIG. 3 is a schematic perspective view of a portion of the molding element according to first embodiment of the present disclosure.
Figure 4:
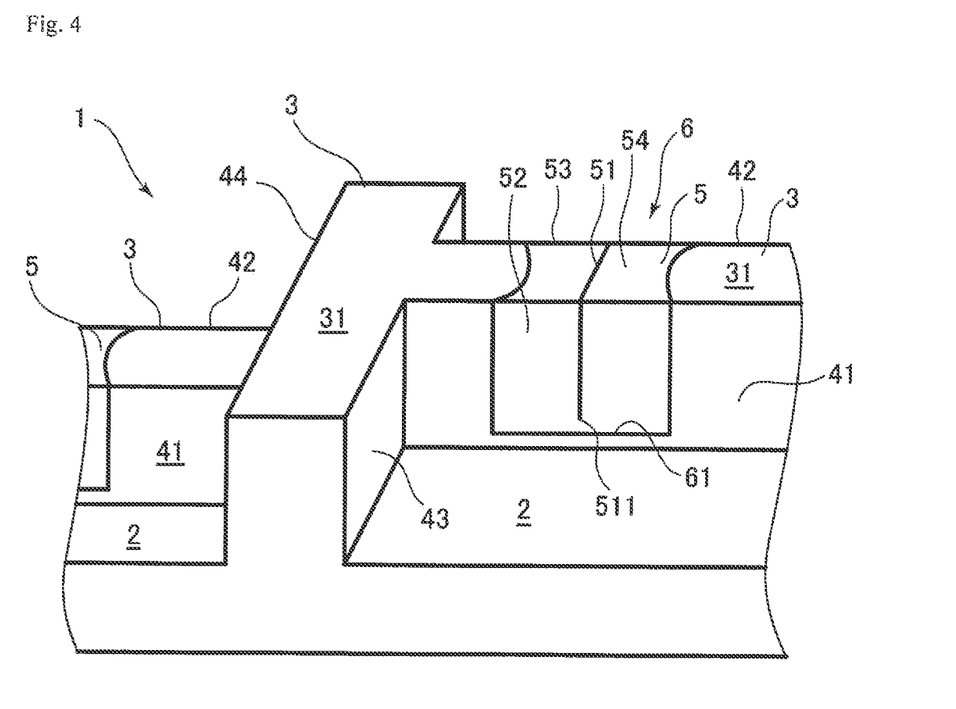
FIG. 4 is a schematic perspective view of a portion of the molding element with a guiding member according to first embodiment of the present disclosure.
Figure 5:
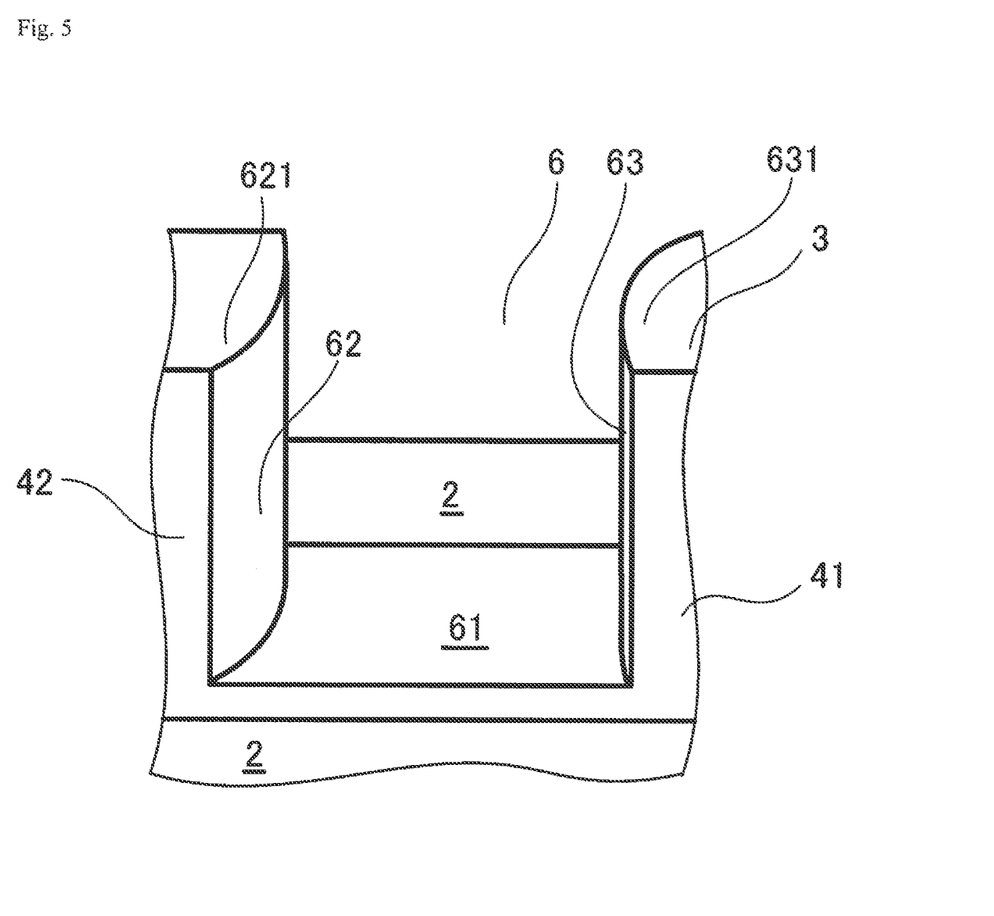
FIG. 5 is an enlarged schematic perspective view showing a portion indicated as V in FIG. 3.

FIG. 1 is a schematic plan view of a tread for a tire molded with a mold comprising a molding element according to a first embodiment of the present disclosure. FIG. 2 is an enlarged schematic perspective view showing a portion indicated as II in FIG. 1. FIG. 3 is a schematic perspective view of a portion of the molding element according to the first embodiment of the present disclosure. FIG. 4 is a schematic perspective view of a portion of the molding element with a guiding member according to the first embodiment of the present disclosure. FIG. 5 is an enlarged schematic perspective view showing a portion indicated as V in FIG. 3.

The tread 101 is a tread for a tire having dimension 205/55R16 and comprises a plurality of circumferential grooves 103a extending in a tire circumferential direction indicated as XX' and axial grooves 103b extending in a generally tire axial direction indicated as YY'.

As shown in FIG. 1, a plurality of contacting elements 104 having generally rectangular parallelepiped shape is formed in the tread 101. The contacting element 104 is delimited by the circumferential grooves 103a in a circumferential direction and is delimited by axial grooves 103b in an axial direction. Thus, the contacting element 104 has two transverse faces (frontal faces) 1041, 1042 facing to circumferentially opposite directions.

Adjacently arranged contacting elements 104 in a circumferential direction are separated by the axial groove 103b. The contacting element 104 has a contact face 102 intended to come into contact with ground during rolling at a top portion thereof.

The tread 101 has the same structure as the conventional tread except for an arrangement regarding the connecting member 105 and is intended to be applied to a conventional pneumatic radial tire. Thus, description of the internal construction of the tread 101 will be omitted.

Between two circumferentially adjacent contacting elements 104, a connecting member 105 having a thin rod-like shape is provided. The connecting member 105 extends across the axial groove 103b between two circumferentially adjacent contacting elements 104, as shown in FIGS. 1 and 2.

In the present embodiment, one connecting member 105 is provided between circumferentially adjacent contacting elements 104 in axially central region in the tread 101. That is, in axially central area, circumferentially adjacent contacting elements 104 are connected by one connecting member 105.

On the other hand, two connecting members 105 are provided between circumferentially adjacent contacting elements 104 in axially outward regions in the tread 101. That is, in axially outward areas, circumferentially adjacent contacting elements 104 are connected by two connecting members 105. Two connecting members 105 are positioned at the same radial position.

In the present embodiment, the connecting members 105 are arranged so as to extend substantially along the circumferential direction keeping the same distance from the rotation axis of the tire. That is, the connecting members 105 extend in parallel to the contact face 102.

Each connecting member 105 extends along the circumferential groove 103a, thus an angle of an extending direction of the connecting member 105 relative to the tire circumferential direction is 0 degree.

In the arrangement of the first embodiment, inhomogeneity of the bending stiffness of the tread 101 in circumferential direction can be drastically decreased, which results less excitation of internal construction of the tire. Thus, noise generated during rolling of the tire can be reduced.

Next, a molding element 1 for a mold used for manufacturing the tread 101 will be described referring to FIGS. 3, 4 and 5.

As shown in FIG. 3, the molding element 1 has a molding surface 2 intended to mold the contact face 102 of the contacting element 104. The molding element 1 also has a plurality of ribs 3 intended to mold the groove 103a, 103b so as to radially outwardly extend from the molding surface 2.

The rib includes a rib top face 31 intended to mold a bottom of the groove 103a, 103b. A radial position of the rib top face 31 can be the same among the ribs 3, or can be different among the ribs 3.

The rib 3 intended to mold the axial groove 103b also includes circumferentially opposing rib side faces 41, 42 intended to mold the frontal faces 1041, 1042 of the contacting element 104. The rib 3 intended to mold the axial groove 103b includes a notching portion 6. The notching portion 6 is formed by removing a part of the rib 3 defined by a bottom face 61 and axially opposing side faces 62, 63.

On each the axially opposing side faces 62, 63 of the notching portion 6, a convex portion 621, 631 having semi-cylindrical shape is integrally formed, as shown in FIG. 5. The convex portions 621, 631 have substantially the same width and radial length as those of the axially opposing side faces 62, 63. The convex portion 621, 631 is oriented such that a longitudinal axis of the semi-cylindrical shape extends in the radial direction of the tread.

Although the convex portion 621, 631 has semi-cylindrical shape in the present embodiment, the convex portion may have different shape such as cubic, rectangular or triangular prism shape which can increase the contact surface area between the guiding member 5 and the notching portion 6. These two convex portions 621, 631 may have different shape each other.

Although the convex portion 621, 631 has substantially the same width as that of the axially opposing side faces 62, 63 in the present embodiment, the convex portion may be provided partly in a width direction of the axially opposing side faces 62, 63. Further, although the convex portion 621, 631 has the same radial length as that of the axially opposing side faces 62, 63 in the present embodiment, the convex portion may be provided partly in the racial direction on the axially opposing side faces 62, 63.

The notching portion 6 receives therein a guiding member 5 having a top face 54 and circumferentially opposed two side faces 52, 53 and being complemental to the notching portion 6. An internal space of the notching portion 6 is filled with the guiding member 5 such that the top face 54 is flush with the rib top face 31 and the side faces 52, 53 are flush with the rib side faces 41, 42 of the rib 3, respectively, as shown in FIG. 4. Thus, the side faces 52, 53 of the guiding member 5 are to form a part of the frontal side faces 1041, 1042 of the contacting element 104.

The material constituting the guiding member 5 has a modulus at 10% elongation lower than that of the molding element. The material of the guiding member 5 is preferably an elastomeric composition. An example of the elastomeric composition is, for example saturated or unsaturated rubbers and thermoplastic elastomers.

The guiding member 5 has a guiding slit 51 extending circumferentially through the guiding member 5 and radially inwardly from the top face 54. That is, the guiding slit 51 extends from one of the opposite two side faces 52, 53 to the other of the opposite two side faces 52, 53 through the guiding member 5 and is open to the side faces 52, 53 and the top face 54 of the guiding member 5.

Although the guiding slit 51 extends radially in the present embodiment, the guiding slit 51 may extend with an angle relative to radial orientation for better demolding of the connecting member 105 for example in a region where an orientation perpendicular to the molding surface 2 differs from radial orientation of the molding element 1. The guiding slit 51 may extend along slightly curved path in radial orientation and/or in circumferential orientation.

With the molding element 1, it is possible to manufacture the tread 101 of a tire having a plurality of contacting element 104 delimited by a plurality of the grooves 103 and having connecting members 105 connecting two side faces 1041, 1042, 1043, 1044 of adjacent contacting elements 104 without complicated process and thus it is possible to improve productivity for manufacturing such tread 101.

A manufacturing of a tread 101 of a tire using a molding element of the first embodiment will be described.

As a first step, at least one connecting member 105 having diameter DC is circumferentially disposed on a surface of an unvulcanized green tire. The unvulcanized green tire with the connecting member 105 is placed in a mold having at least one molding element 1 described above.

The connecting member 105 is an elongated member such as cable, wire or strings. The connecting member 105 may be put on the surface of unvulcanized green tire, partly or completely, manually or automatically using a process similar to put semi-finished material circumferentially. The connecting member 105 may be sticked onto the surface of unvulcanized green tire with a help of, for example an adhesive or another unvulcanized rubber.

Then, as the unvulcanized green tire is moved toward the mold element 1, the connecting member 105 on the surface of the unvulcanized green tire is in contact with an upper end of the guiding slit 51 and then, forcibly opens the upper end of the guiding slit 51.

Then, the connecting member 105 is continuously pushed downwardly by portions of the green tire located in circumferentially both sides of the rib 3 and penetrated into and moved downwardly toward the closed end 511 along the guiding slit 51, deforming the guiding member 5 outwardly in a width direction. Once the connecting member 105 has passed, the guiding slit 51 is closed again.

Once the connecting member 105 reaches the closed end 511 of the guiding slit 51, the connecting member 105 cannot be further moved and stop at the closed end 511. On the other hand, the portions of the green tire located in circumferentially both sides of the rib 3 further continuously downwardly moves toward the molding surface 2 of the molding element 1. Since the guiding slit 51 is closed behind the connecting member 105, the rubber does not enter into the guiding slit 51.

Once the portions of the green tire located in circumferentially both sides of the rib 3 reaches the molding surface 2 of the molding element 1, the portions of the green tire stop moving and the mold is closed.

Then heat and pressure is applied for vulcanizing and molding the green tire. During this process, the green tire is turned to the tread 101 of the tire, to which tread 101 the connecting member 105 is fixedly attached so as to connect two frontal faces 1041, 1042 of the adjacent contacting elements 104. Specifically, a part of the connecting member 105 is exposed in the axial groove 103b and remaining part of the connecting member 105 is embedded in the contacting elements 104.

After completion of vulcanization and molding, the mold is opened. During demolding, the part of the connecting member 105 exposed in the axial groove 103b is escaped from the guiding member 5 passing through the guiding slit 51.

With the molding element 1, it is possible to manufacture the tread 101 of a tire having the plurality of contacting element 104 delimited by a plurality of the grooves 103 and having the connecting members 105 connecting two side faces 1041, 1042, 1043, 1044 of adjacent contacting elements 104 without complicated process and thus it is possible to improve productivity for manufacturing such tread 101.

Since the guiding slit 51 opens to the two side faces 52, 53 and the top face 54 of the guiding member 5 and extends radially, it is possible to position the connecting member 105 at a predetermined position in the contacting elements 104 and to leave the connecting member 105 there without any complicated process.

Since the material constituting the guiding member 5 has lower modulus at 10% elongation than that of the molding element 1, it is possible to let the connecting member 105 easily enter to/exit from the guiding slit 51. Further, once the connecting member 105 has passed, the guiding slit 51 is closed, the rubber does not flash into the guiding slit 51 during molding.

Since the notching portion 6 is filled with the guiding member 5 made of the material different from material constituting the molding element 1, it is possible to maintain a form of the side faces 1041, 1042, 1043, 1044 of the contacting element 104. As a result hydroplaning performance can be maintained.

Since the guiding member 5 is a separate and replaceable member, maintenance of the molding element 1 can be easier.

Since the elastomeric composition constituting the guiding member 5 is different from the material constituting the molding element 1, it is possible to prevent rubber from being penetrated into the guiding slit 51 during molding.

Figure 6:
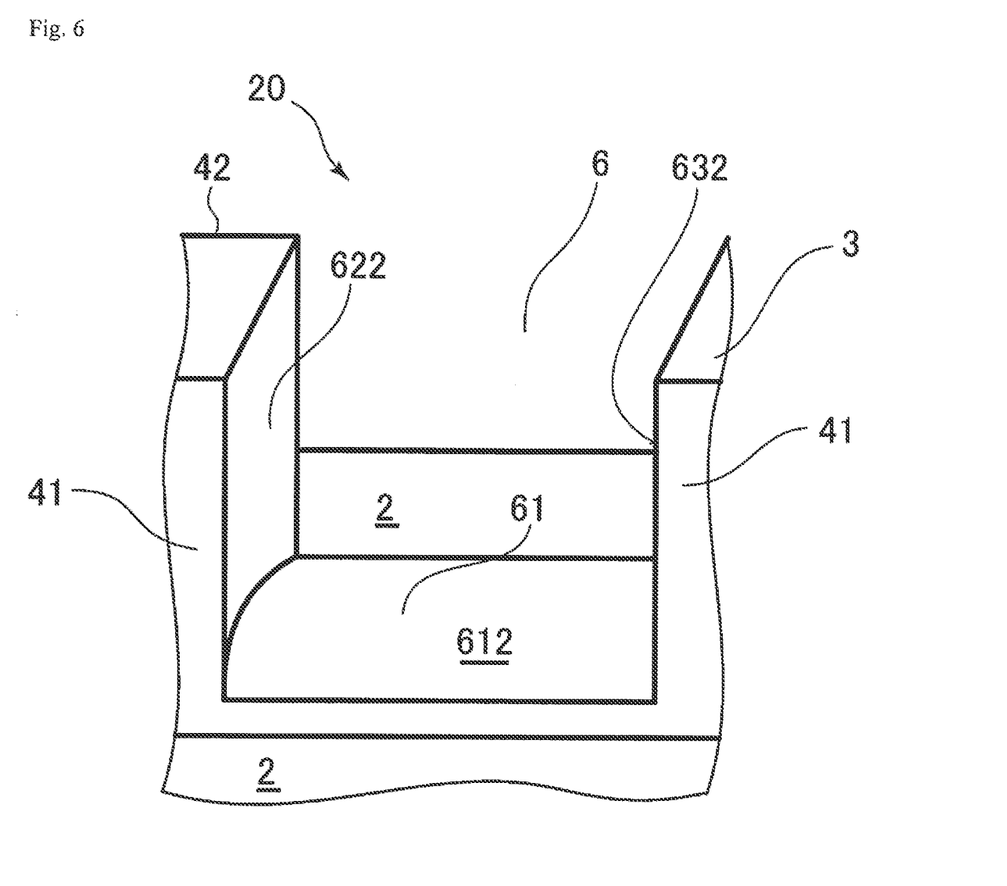
FIG. 6 is an enlarged schematic perspective view of a molding element according to second embodiment of the present disclosure.

A molding element 20 according to a second embodiment of the present disclosure will be described referring to FIG. 6. FIG. 6 is an enlarged schematic perspective view of a molding element according to the second embodiment of the present disclosure. The constitution of the second embodiment is similar to that of the first embodiment other than the arrangement shown in FIG. 6, thus description will be made referring to FIG. 6.

In the second embodiment, a convex portion 612 having semi-cylindrical shape is integrally formed on a bottom face 61 of a notching portion 6, as shown in FIG. 6. The convex portion 612 has substantially the same width and radial length as those of the bottom face 61. The convex portion 612 is oriented such that a longitudinal axis of the semi-cylindrical shape extends between the axially opposing faces 622, 632 at axially central positon of the rib 3.

In this embodiment, the axially opposing faces 622, 632 do not have convex portion having semi-cylindrical shape and are formed as a flat face.

Since the bottom face 61 of the notching portion 6 is provided with the convex portion 612, it is possible to keep or maintain the guiding member 5 in place in the notching portion 6 during molding and demolding sustaining the force applied from the connecting member 105 in particular in the direction along which the connecting member 105 is extending by increasing contact surface area between the guiding member 5 and the notching portion 6 with minimum modification of the faces of the notching portion 6.

Figure 7:
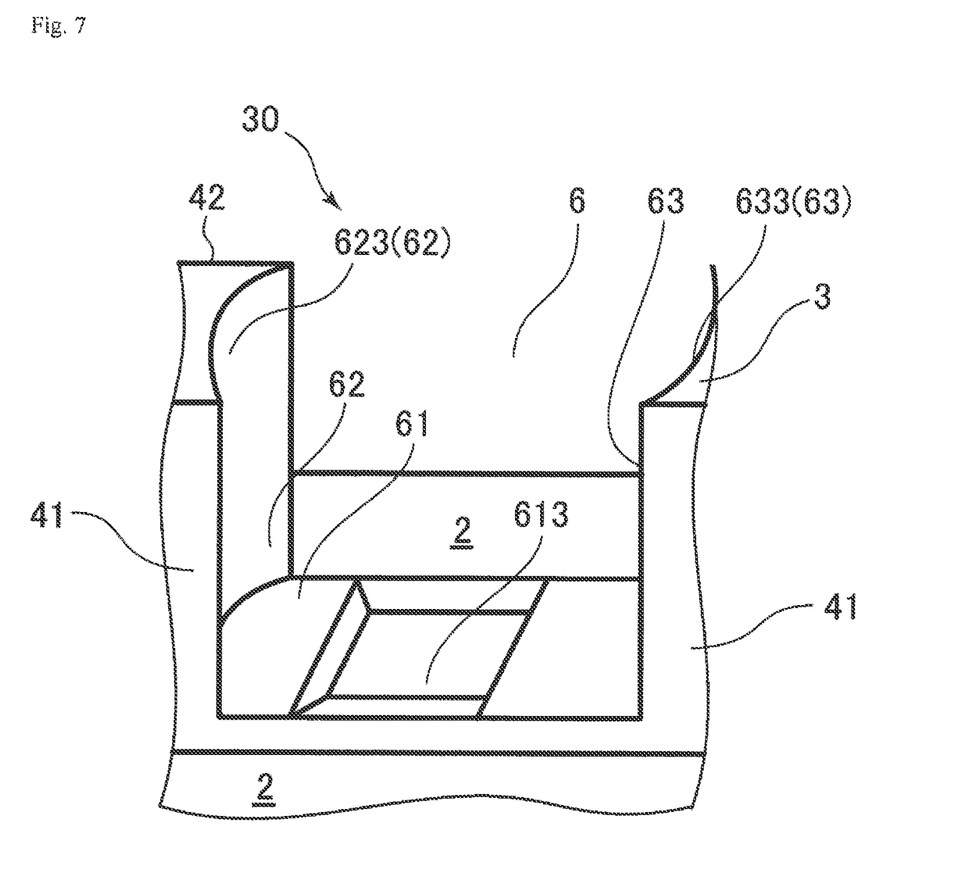
FIG. 7 is an enlarged schematic perspective view of a molding element according to third embodiment of the present disclosure.

A molding element 30 according to a third embodiment of the present disclosure will be described referring to FIG. 7. FIG. 7 is an enlarged schematic perspective view of a molding element according to the third embodiment of the present disclosure. The constitution of the third embodiment is similar to that of the first embodiment other than the arrangement shown in FIG. 7, thus description will be made referring to FIG. 7.

In the third embodiment, a recessed portion (concave portion) 613 having rectangular shape is formed in a bottom face 61 of a notching portion 6, as shown in FIG. 7. The recessed portion 613 is placed at a central position between axially opposing faces 62, 63 of the notching portion 36.

In the third embodiment, each of the axially opposing faces 62, 63 has a concave portion 623, 633 having semi-cylindrical shape, respectively. The concave portions 623, 633 have substantially the same width and radial length as those of the axially opposing faces 62, 63, respectively. Each of the concave portions 623, 633 is oriented such that a longitudinal axis of the semi-cylindrical shape extends in the radial direction of the tread.

Since each of the axially opposing faces 62, 63 of the notching portion 6 is provided with the concave portion 623, 633, it is possible to keep or maintain the guiding member 5 in place in the notching portion 6 during molding and demolding sustaining the force applied from the connecting member 105 in particular in the direction along which the connecting member 105 is extending by supporting the guiding member 5 from two directions.

The recessed portion 613 formed on the bottom face 61 of the notching portion 6 further emphasize such effect of sustaining the force applied from the connecting member 105 in particular in the direction along which the connecting member 105 is extending thanks to level difference made by the recessed portion 613.

Figure 8:
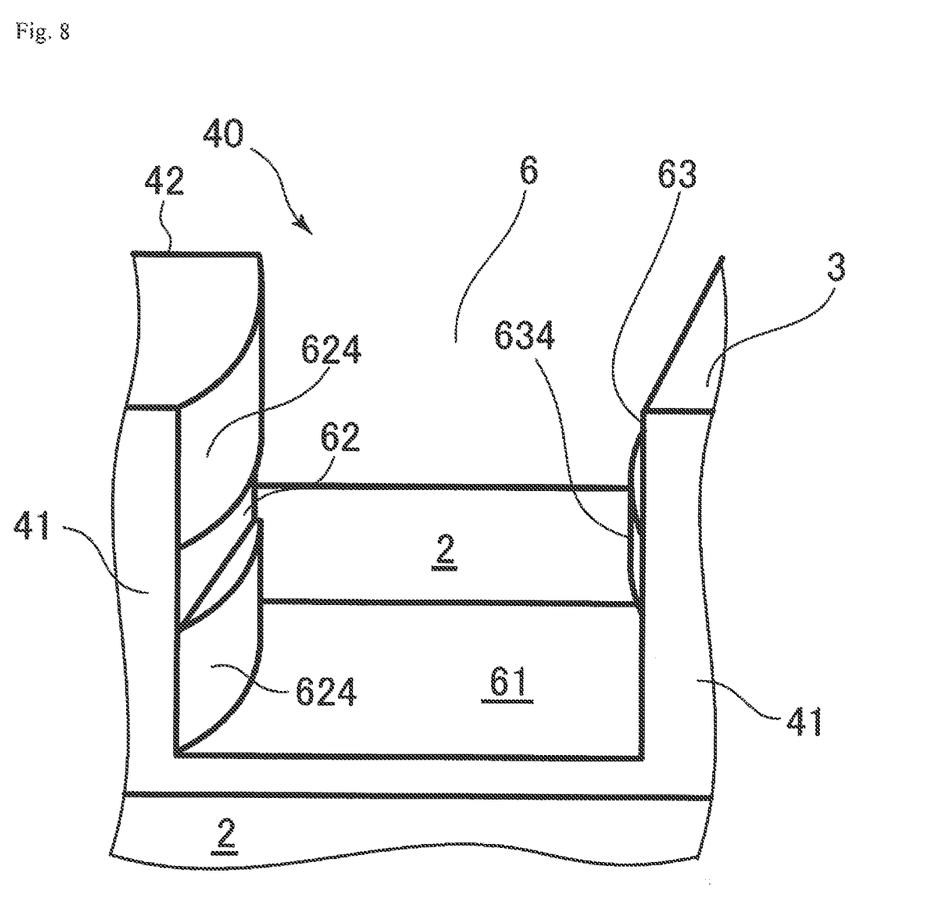
FIG. 8 is an enlarged schematic perspective view of a molding element according to fourth embodiment of the present disclosure.

A molding element 40 according to a fourth embodiment of the present disclosure will be described referring to FIG. 8. FIG. 8 is an enlarged schematic perspective view of a molding element according to the fourth embodiment of the present disclosure. The constitution of this fourth embodiment is similar to that of the first embodiment other than the arrangement shown in FIG. 8, thus description will be made referring to FIG. 8.

In the fourth embodiment, one axially opposing face 62 of the notching portion 6 has a pair of convex portions 624, 624 each having semi-cylindrical shape. The convex portion 624 has substantially the same width as that of the axially opposing face 62. The convex portions 624, 624 are radially separately positioned on the axially opposing face 62 so as to be oriented such that a longitudinal axis of the semi-cylindrical shape extends in the radial direction of the tread. Specifically, one of the convex portions 624 is provided at a top position on the axially opposing face 62 and other of the convex portions 624 is provided at a bottom position on the axially opposing flare 62. Between the convex portions 624,624, the axially opposing face 62 is flat.

Further, another axially opposing face 63 includes a convex portions 634 having semi-cylindrical shape between upper and lower flat portions thereon. The convex portion 634 has the same shape as that of the convex portion 624 and is positioned at a radially central position on the axially opposing face 63 so as to be oriented such that a longitudinal axis of the semi-cylindrical shape extends in the radial direction of the tread.

In the fourth embodiment, a bottom face 61 of a notching portion 6 is flat.

Since each of the axially opposing faces 62, 63 of the notching portion is provided with the pair of convex portions 624, 624 and the convex portion 634 on the opposite side face of the notching portion 6, it is possible to keep or maintain the guiding member 5 in place in the notching portion 6 during molding and demolding sustaining the force applied from the connecting member 105 in particular in the direction along which the connecting member 105 is extending and in radial direction.

Figure 9:
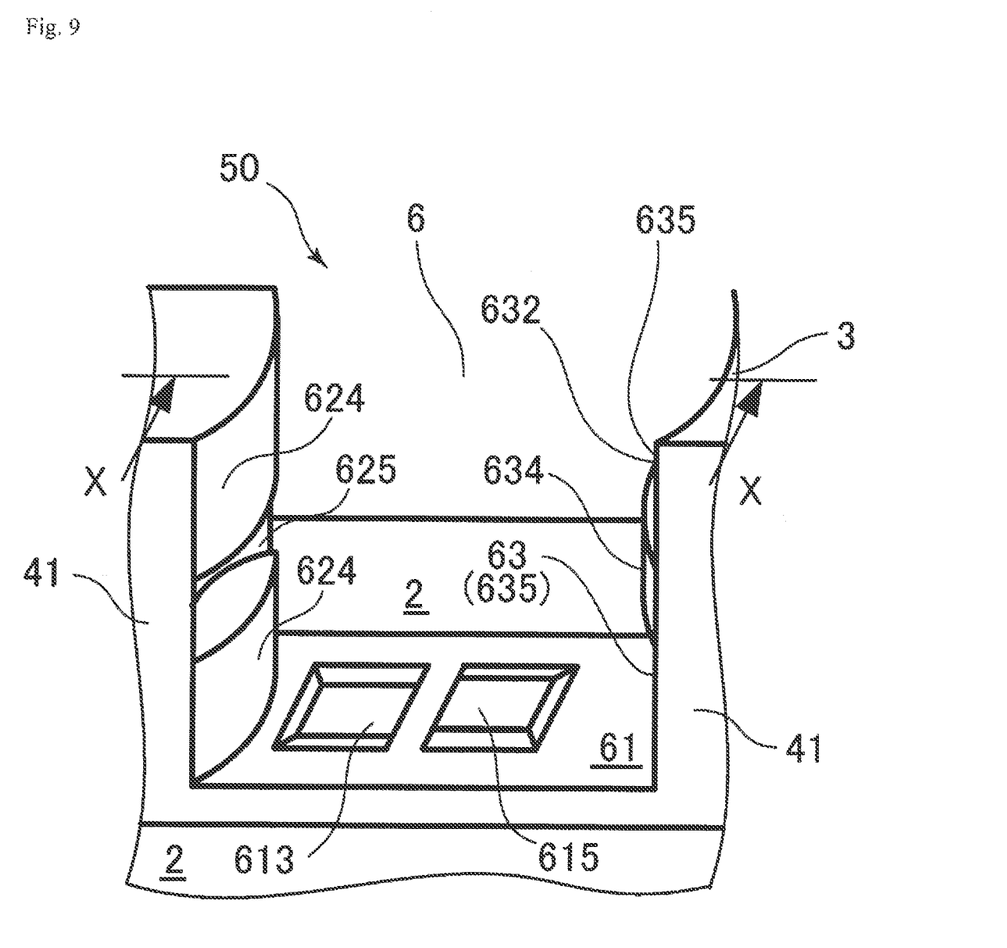
FIG. 9 is an enlarged schematic perspective view of a molding element according to fifth embodiment of the present disclosure.
Figure 10:
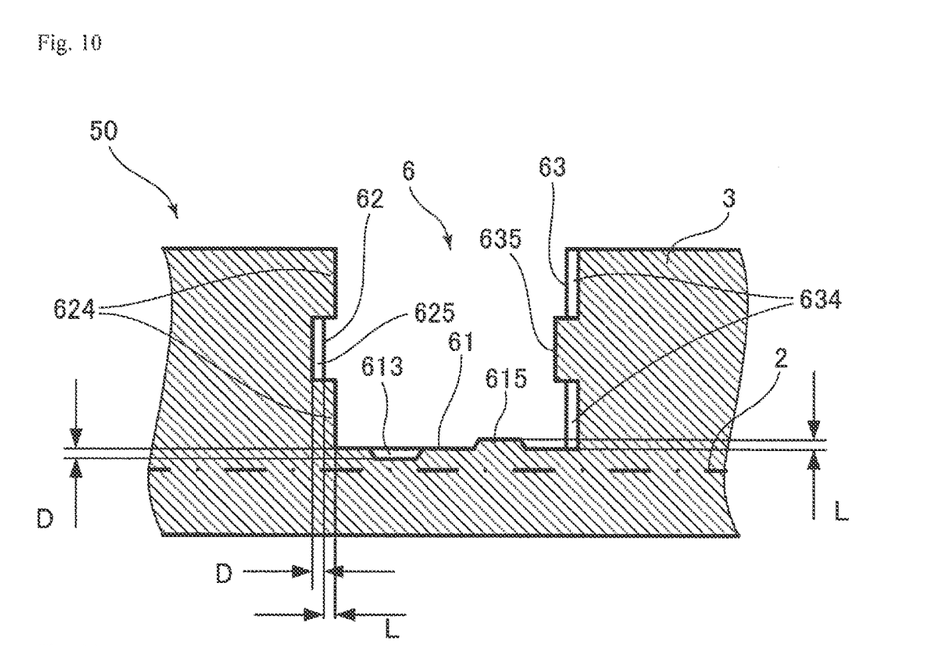
FIG. 10 is a cross sectional view taken along line X-X in FIG. 9.

A molding element 50 according to a fifth embodiment of the present disclosure will be described referring to FIGS. 9 and 10. FIG. 9 is an enlarged schematic perspective view of a molding element according to the fifth embodiment of the present disclosure. FIG. 10 is a cross sectional view taken along line X-X in FIG. 9. The constitution of this fifth embodiment is similar to that of the fourth embodiment other than the arrangement shown in FIGS. 9 and 10, thus description will be made referring to FIGS. 9 and 10.

In the fifth embodiment, one axially opposing face 62 has a pair of convex portions 624, 624 at upper and bottom positions thereof similarly to those in the fourth embodiment.

In the fifth embodiment, a concave portion 625 is provided in the axially opposing face 62 between the convex portions 624, 624. The concave portion 625 has the substantially same width as the axially opposing face 62 and is oriented such that the axis of the cylindrical shape extends in a radial direction. The convex portions 624, 624 and the concave portion 625 have the same radial length.

Further, the other axially opposing face 63 has a pair of concave portions 635, 635 at upper and bottom positions thereon. Each of the concave portions 635, 635 has semi-cylindrical shape oriented such that a longitudinal axis extends in a radial direction.

In the fifth embodiment, a convex portion 634 is provided between the concave portions 635, 635 on the axially opposing face 63. The convex portion 634 has the substantially same width as the axially opposing face 63 and is oriented such that the axis of the cylindrical shape extends in a radial direction. The concave portions 635, 635 and the convex portion 634 have the same radial length. As a result, the axially opposing faces 62, 63 in the fifth embodiment are complemental to each other.

Further, in fifth embodiment, a rectangular recessed portion (concave portion) 613 and a rectangular protruding portion (convex portion) 615 are formed in a bottom face 61 of a notching portion 6. The rectangular recessed portion 613 and the rectangular protruding portion 615 are positioned in series between the axially opposing side faces 62, 63 as shown in FIGS. 9 and 10.

Since the concave portions 625, 635, 635 and convex portions 624, 624, 634 are provided on the axially opposing faces 62, 63 and the recessed and protruding portions are formed in a bottom face 61, it is possible to keep or maintain the guiding member 5 in place in the notching portion during molding and demolding sustaining the force applied from the connecting member 105 in particular in the direction along which the connecting member 105 is extending and in radial direction.

Figure 11:
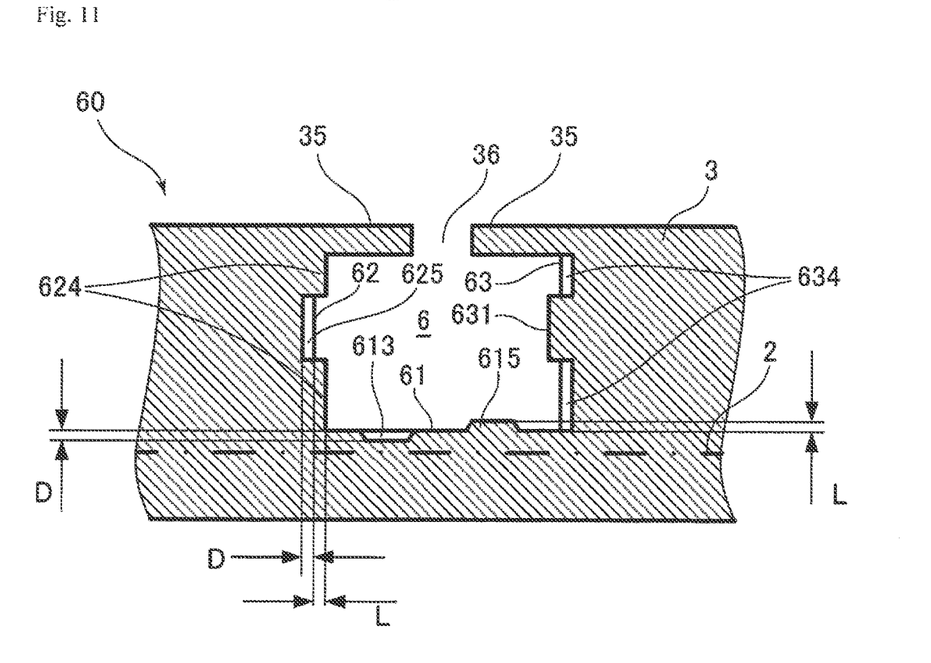
FIG. 11 is a schematic cross sectional view of a molding element according to sixth embodiment of the present disclosure.

A molding element 60 according to a sixth embodiment of the present disclosure will be described referring to FIG. 11. FIG. 11 is an enlarged cross sectional view of a molding element according to the sixth embodiment of the present disclosure. The constitution of this sixth embodiment is similar to that of the fifth embodiment other than the arrangement shown in FIG. 11, thus description will be made referring to FIG. 11.

In a sixth embodiment, a pair of rib projecting members 35 projects inwardly from axially opposed side faces 62, 63 of the notching portion 6 so as to a central part of the top face 54 of the guiding member 5 (not shown in FIG. 11) is exposed through a rib projection opening portion 36 formed between the pair of rib projecting members 35, 35.

A guiding slit 51 of the guiding member 5 is placed at the central exposed part of the top face 54 exposed through a rib projection opening portion 36. The rib projection opening portion 36 is devoid of the guiding member 5.

By the pair of rib projecting member 35, it is possible to prevent the guiding member 5 from slipping out of the notching portion 6 during demolding while securing the connecting member 105 entering to/exiting from the guiding slit 51.

In the above all embodiments, a convex distance L of the convex portion and a concave distance D of the concave portion is preferably at least equal to 0.05 mm. In the present application, the convex distance L of the convex portion is a height of the convex or protruding portion. The concave distance D of the concave portion is a depth or the concave or recessed portion.

The disclosure is not limited to the examples described and represented and various modifications can be made there without leaving its framework.

The invention claimed is:

1. A mold employed for manufacturing a tread of a tire having a plurality of contacting elements delimited by a plurality of grooves and a connecting member connecting two side faces of adjacent contacting elements of the plurality of contacting elements, comprising:
    a molding element, comprising;
        a molding surface for forming a contact face onto one of the plurality of contacting elements,
        a rib for forming one of the grooves of the plurality of grooves between adjacent contacting elements, and at least two rib side faces forming the two side faces, and
        the rib having a notching portion;
    a guiding member made of a material different from a material of the molding element being received in the notching portion and having two opposite side faces shaped to form a part of the side faces of the contacting element and a top face shaped to form a part of a bottom of the groove;
    wherein said material of the guiding member has a modulus at 10% elongation lower than that of the molding element;
    the guiding member having a guiding slit extending from one of the two opposite side faces to the other of the two opposite side faces through the guiding member and radially from the top face; and
    wherein at least one of faces of the notching portion allows the guiding member to be kept in place in the notching portion.

2. The mold according to claim 1, wherein the at least one of faces of the notching portion has a convex portion.

3. The mold according to claim 1, wherein the at least one of faces of the notching portion has a concave portion.

4. The mold according to claim 1, wherein a bottom face of the notching portion is shaped to allow the guiding member to fit within the notching portion.

5. The mold according to claim 1, wherein two opposite side faces of the notching portion are shaped to allow the guiding member to fit within the notching portion.

6. The mold according to claim 1, wherein the at least one of faces of the notching portion has both a concave and convex portion.

7. The mold according to claim 1, wherein the at least one of faces of the notching portion has both a plurality of concave and convex portions.

8. The mold according to claim 2, wherein a convex distance L of the convex portion that is a height of the convex portion is at least equal to 0.05 mm.

9. The mold according to claim 1, wherein the top face of the guiding member is partly covered by a pair of rib projection members projecting from opposed side faces of the notching portion and the guiding slit is exposed through a rib projection opening portion formed between the pair of rib projection members.

10. The mold according to claim 8, wherein the rib projection opening portion is devoid of the guiding member.

11. The mold according to claim 3, wherein a concave distance D of the concave portion that is a depth of the concave portion is at least equal to 0.05 mm.

* * * * *